June 5, 1934.  J. GOULDER  1,961,663
APPARATUS FOR TESTING THE ACCURACY OF GEAR TEETH
Filed July 8, 1932
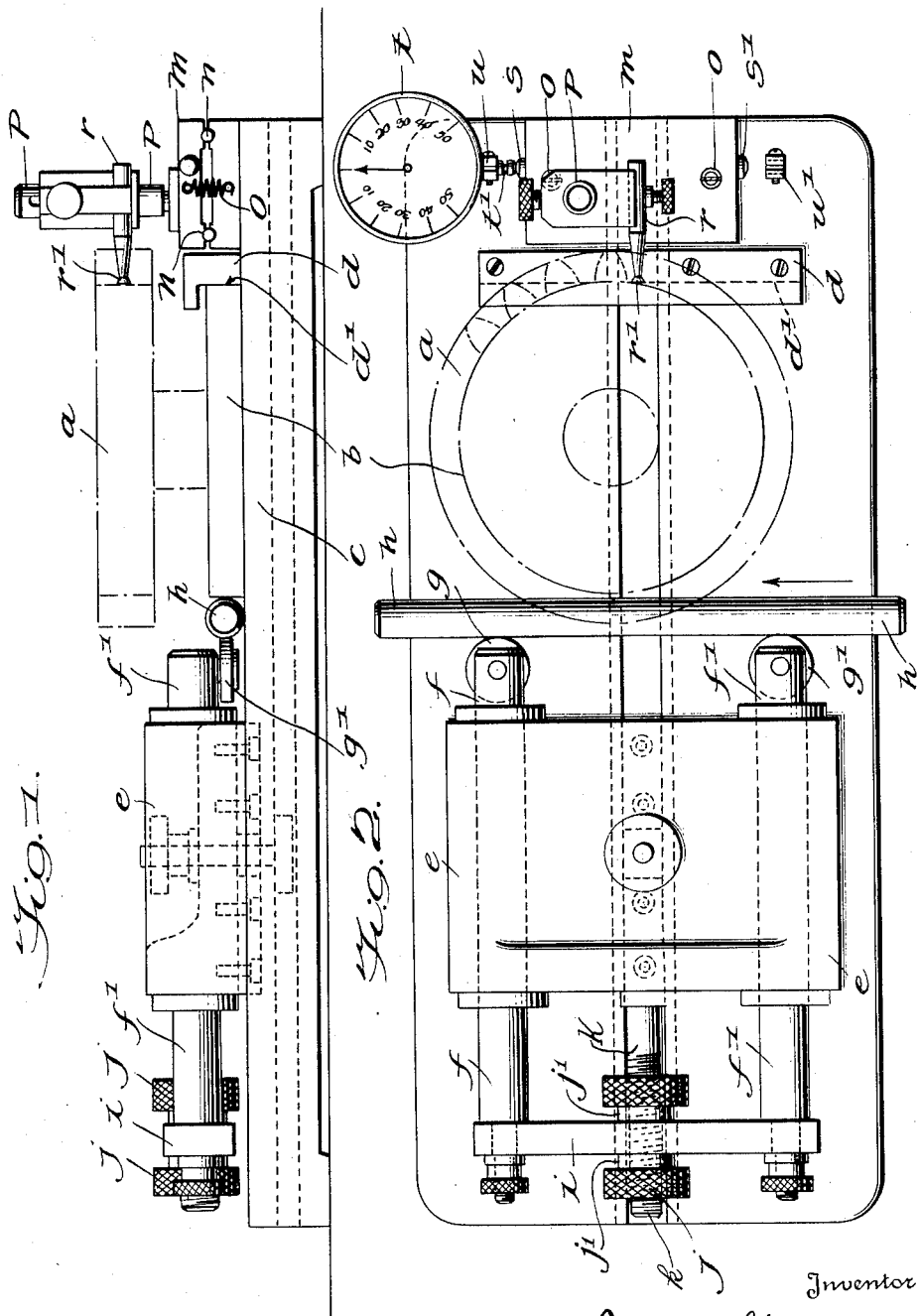

Patented June 5, 1934

1,961,663

UNITED STATES PATENT OFFICE 1,961,663

APPARATUS FOR TESTING THE ACCURACY OF GEAR TEETH

James Goulder, Huddersfield, England, assignor to David Brown & Sons (Huddersfield) Limited, Huddersfield, England Application July 8, 1932, Serial No. 621,500 In Great Britain July 9, 1931

2 Claims. (Cl. 73—51)

The invention relates to apparatus for testing the accuracy of gear teeth, and particularly for determining the accuracy or otherwise of the profiles of involute teeth.

The invention has for its object to provide improved means for the purpose which will be simple in construction and easy to operate, and which will afford great sensitivity of action in the actual measuring device.

Apparatus according to the invention is characterized in that a base-disc, carrying the gear to be tested, is adapted to be rolled between a fixed straight-edge and a rod or bar by axial displacement of the latter, a gauging member being arranged to bear against a tooth profile of the gear and an indicator being provided to show, as the gear is rolled, any movement of the gauging member due to irregularity in contour of the tooth profile.

In the accompanying drawing,

Fig. 1 is an elevation; and

Fig. 2 a plan view of a gear testing apparatus embodying the invention.

Referring to the drawing $a$ represents a gear the teeth of which are to be tested, and which is slidably mounted on an arbor carried by a base disc $b$, the under surface of which is plane and rests on the plane upper surface of a plate $c$ forming, in the instance shown, the base of the apparatus.

Mounted on the base plate $c$ is a rod or bar $d$ having a plane surface $d'$ forming a straight-edge along which the periphery of the base disc $b$ is adapted to roll.

Also mounted on the base plate $c$ is a carriage $e$ adapted to be clamped to the base in any desired relation to the straight-edge $d$ according to the diameter of the gear to be tested.

Passing through the carriage $e$ are two spindles $f$, $f'$ carrying rollers $g$, $g'$, at their inner ends. The spindles are arranged parallel to one another, and the rollers carried by their inner ends are disposed at exactly the same distance from the straight-edge.

The carriage is so positioned in relation to the straight-edge that between the base disc $b$ and the rollers $g$, $g'$, there can be accommodated a rod or bar $h$, having parallel opposed faces, when the diametrically opposed peripheral portion of the base disc is in contact with the straight-edge.

When the base disc and gear have been placed in position, the spindles $f$, $f'$, are moved, to cause their rollers to exert pressure against the rod or bar $h$, by means of a cross bar $i$ which connects the two spindles $f$ and $f'$ and a nut member $j$ working on a projection $K$ having threads $k$ from the carriage $e$. This projection extends through an opening in the bar $i$ and the position of the latter is determined by the positioning of the nuts $j$ on the projection $K$. It is noted that the nuts $j$ are provided with shoulders $j^1$ which contact against the bar $i$. The bar $i$ is nipped up against shoulders on $f$ and $f^1$ so that as the nuts $j$ are adjusted $f$ and $f^1$ slide equally toward or away from the bar $h$. When pressure is thus exerted against the rod or bar $h$ in the direction of its length, its axial movement will cause the base disc to be given, by friction, a rolling motion along the straight-edge.

Mounted on the base plate $c$, so as to be capable of movement parallel to the face of the straight-edge is a slide $m$ which is supported on balls $n$ and is adapted to be retained normally in a central position by springs $o$ having their ends connected to the slide and to the base respectively.

Extending up from the slide $m$ is a pillar $p$ on which is adapted to be clamped, in adjusted vertical position, a gauging member $r$.

An abutment $s$ on the slide $m$ is adapted to bear against the spindle $t'$ of a suitable spring-actuated dial indicator $t$, a clamp $u$ on the base holding the indicator detachably in position.

The gauging member $r$ has a gauging point $r'$ in the form of a disc having a flat outer face and a tapered inner face, so as to present a conical end piece with a circular knife edge, which latter is arranged to be in the plane of the straight-edge.

In operation, the gear is adjusted by hand so that the gauging point engages the face of the involute to be tested with sufficient pressure to cause the pointer of the indicator to occupy a central or zero position. The gear is then caused to roll, by axial movement of the bar or rod $h$, and providing the gauging point lies in the plane of the straight-edge as mentioned, the said point will maintain contact with a true involute, as the gear is rolled, without causing any movement of the pointer of the indicator. If, however, any error is present in the profile of the involute the pointer will move in one direction or the other from zero and thus indicate the presence, nature and amount of the error.

An abutment $s'$ is provided at the opposite end of the slide $m$ from the abutment $s$ and a second clamp $u'$ is also provided on the base, so that the indicator can be placed on the opposite side of the slide to enable the opposite side of the tooth to be tested.

The diameter of the base disc $b$ is equal to the base diameter of the involute to be measured, which in turn is equal to the pitch diameter of the gear multiplied by the cosine of the pressure angle.

The conical shape of the gauging point facilitates setting and provides, further, an ample wearing surface, as the gauging member can be partially rotated, when desired, to present a new portion of the periphery of the engaging surface for use.

Having thus described my invention, what I claim as new and desire to secure by Letters Patent is:—

1. Apparatus for testing the profile accuracy of involute gear teeth comprising in combination a base disc adapted to carry a gear to be tested, a fixed straight-edge and a rod between which the base disc is disposed, means to position the rod with its inner face parallel to the straight-edge and to press said inner face against the periphery of the base disc so that axial movement of the rod will cause the base disc to roll on the straight-edge, a movable gauging member adapted to bear against the tooth profile of the gear to be tested and an indicator to show, as the gear is rolled, any movement of the said gauging member due to irregularity in contour of the tooth profile.

2. In a device of the class described, a base, a slidable disc carried by said base and adapted to carry a gear to be tested, a fixed straight edge member and a movable rod between which the disc is disposed, means including a movable member for bearing laterally against said rod to urge the latter into engagement with the disc so that axial movement of the rod will cause the disc to roll on the fixed straight-edge member, a slide member arranged adjacent said straight-edge member, a gauging member carried by said slide and adapted to bear against the tooth profile of the gear to be tested and an indicator to show as the gear is rolled any movement of the said gauging member due to irregularity in contour of the tooth profile.

JAMES GOULDER.